United States Patent [19]

Schippers et al.

[11] 4,029,452

[45] June 14, 1977

[54] APPARATUS FOR CALIBRATING AN EXTRUDED THERMOPLASTIC TUBE

[75] Inventors: Heinz Schippers, Remcheid; Gerhard Koslowski, Huckeswagen, both of Germany

[73] Assignee: Barmag Barmer Maschinenfabrik Aktiengesellschaft, Wuppertal, Germany

[22] Filed: Dec. 3, 1975

[21] Appl. No.: 637,369

[30] Foreign Application Priority Data

Dec. 3, 1974 Germany .......................... 2456986

[52] U.S. Cl. .................................. 425/71; 425/325
[51] Int. Cl.² .......................................... B29C 25/00
[58] Field of Search ......................... 425/325–329, 425/343, 392, 71, 404, 445, 446, 67, 68, 69; 264/89, 95, 90, 209

[56] References Cited

UNITED STATES PATENTS

| | | |
|---|---|---|
| 2,138,394 | 11/1938 | Wuppermann ...................... 425/67 |
| 3,378,887 | 4/1968 | Reib et al. ............................ 264/90 |
| 3,538,210 | 11/1970 | Gatto .................................... 264/209 |
| 3,668,288 | 6/1972 | Takahashi ........................... 264/89 |

Primary Examiner—Richard B. Lazarus
Attorney, Agent, or Firm—Keil, Thompson & Shurtleff

[57] ABSTRACT

An apparatus for the manufacture of an extruded thermoplastic tube in which the freshly extruded tube is cooled and sized or calibrated in a liquid cooling medium by passage through a series of draw plates in which the cooling liquid is fed and directed in a spiral flow path emerging along the circumference of the tube as it passes through the central calibrating opening of each draw plate. The draw plates are preferably immersed in water as the cooling liquid partially filling a tank maintained under a vacuum.

17 Claims, 10 Drawing Figures

APPARATUS FOR CALIBRATING AN EXTRUDED THERMOPLASTIC TUBE

The present invention is directed to the manufacture of a thermoplastic tube or pipe by extrusion and subsequent cooling and sizing or calibration of the hot extruded tube in a liquid cooling bath. More particularly, the present invention is directed to an improvement in the sizing or calibration apparatus and method so that a continuous supply of the cooling liquid is directed in a spiral flow pattern onto the tube as it is drawn through the draw plates or sizing plates to achieve a uniform sizing or calibration of the final outside diameter of the tube.

Various known methods of extruding molten thermoplastics, e.g. polyethylene and polyvinyl chloride (PVC), are disclosed in standard texts such as "Plastics Extrusion Technology" by Griff, Second Edition (1968), Van Nostrand Reinhold Company, Chapter Three, pages 49 – 93. An especially preferred method for purposes of the present invention is that requiring a tank partially filled with a liquid cooling medium and maintained under a vacuum so that the extruded tube with its interior open to the atmosphere will tend to expand against the restraining and collar-type sizing effect of a series of draw plates aligned at spaced intervals along the tube axis within the tank. This technique is sometimes referred to as the "vacuum trough" or "vacuum tank" sizing method and is of particularly valuable use for purposes of the present invention. However, other known techniques such as the sizing-sleeve method, the extended-mandrel method or even the non-vacuum sizing plate method may also be adapted for purposes of the present invention.

One early method of tube extrusion is illustrated by U.S. Pat. No. 2,423,260 in which draw or sizing plates of different cross-sectional shapes and arrangements are placed in a cooling bath to calibrate the outside diameter of the tube. Examples of such calibration of a hollow tubular plastic extrusion under the effect of an externally applied vacuum are provided by the following German printed or published patent specifications: DT-AS No. 1,201,038; DT-AS No. 1,920,837; DT-AS No. 1,936,428; and DT-OS No. 2,239,746.

Attention is particularly directed to DT-OS No. 2,244,294 in which the liquid cooling medium is supplied through an annular chamber radially through an annular gap or slot onto the outer circumferential surface of the thermoplastic tube being calibrated. The calibrating tool used for this purpose is constructed in the zone or region of the annular gap such that the flowing liquid produces reduced pressure or partial vacuum on the tube surface. In this type of calibration with a simultaneous conduction of the liquid coolant in the calibrating nozzle, there is an improvement of heat transfer between the cooling agent and the tube being calibrated because the liquid flow stream in the longitudinal direction of the tube breaks up the fluid film normally carried or coated on the tube surface and causes a turbulent flow of liquid at this point with a correspondingly increased heat transfer as compared to laminar flow. Thus, the liquid present in the cooling device is made more turbulent and its temperature becomes more uniform due to the mixing effect of the liquid stream.

It is an object of the present invention to provide further improvements in such cooling and calibrating apparatus for the production of hollow profiled tubes, especially cylindrical tubing or piping, composed of a thermoplastic polymer which can be melt extruded and drawn off on otherwise conventional equipment. More particularly, the objects of the present invention include a much greater rate of heat transfer during cooling, an increase of the calibrating and draw-off speeds of the tubing or piping, a reduction in the space requirements for the apparatus, especially the length of the cooling bath or tank, and the avoidance or at least a substantially reduction of the mechanical stresses, deformations or similar undesirable changes in the tube during drawing-off with calibration or sizing under cooling. Other objects and advantages of the invention will become more apparent upon consideration of the following detailed disclosure.

It has now been found, in accordance with the invention, that a substantially improved cooling and sizing of the freshly extruded hot thermoplastic tube or pipe is achieved in drawing the tube through a liquid cooling bath containing a series of spaced draw plates for sizing the outer diameter of the tube by feeding the liquid cooling medium through each draw plate in a spiral path exiting on the circumferential surface of the tube as it passes through the draw plate. The liquid coolant is preferably conducted at a high velocity in its spiral path sufficient to produce a turbulent spiral or helical flow along the circumferential surface of the tube as it passes through the draw plate. In effect each draw plate is constructed not only as a sizing means with a central opening to calibrate the outer diameter of the tube but also as an annular jet nozzle having a concentric annular slot or gap exiting directly adjacent the periphery of the tube, e.g. at the face of each draw plate on one side of the sizing opening thereof. The speed of the jet stream of cooling liquid onto the tube is substantially increased by the spiral flow path through the draw plate, preferably with a reduction in the cross-section of this spiral flow path at least at the annular exit slot or gap. By incling this exit slot or gap at an angle of less than 45° and preferably less than 30° with reference to the tube axis, very little deformation or undesirable stress is placed on the freshly extruded hot thermoplastic tube. This angle becomes less critical where the tube is rapidly cooled and rigidified, especially as it proceeds further through the cooling bath so that the angle of inclination of the jet cooling stream, i.e. exiting from the annular slot, can vary from about 15° up to 90°.

The cooling and calibrating or sizing procedure of the present invention is preferably carried out in the vacuum tank type of apparatus wherein the liquid cooling medium, especially water or an equivalent aqueous coolant, partially fills the sizing tank which is maintained under a vacuum and which holds the draw plates at spaced intervals along the length of the tank.

One type of suitable vacuum tank sizing apparatus is disclosed hereinafter by way of example together with a number of preferred variations in the individual elements used in the cooling and sizing or calibrating means of the invention, all as illustrated with the aid of the accompanying drawings in which.

Figure 1:
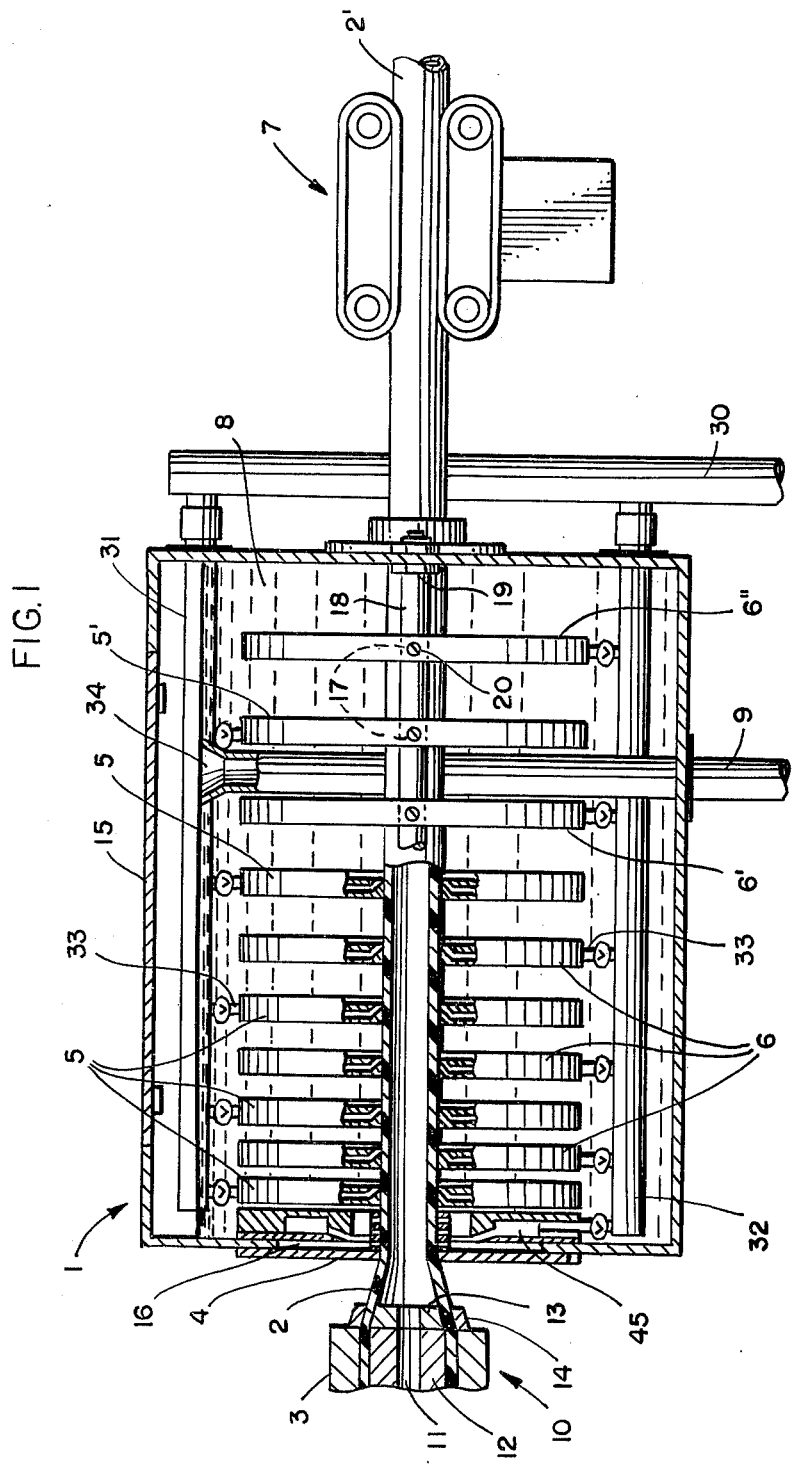
FIG. 1 is a partly schematic and sectional side view of a vacuum tank sizing apparatus in position between a melt extruder and a puller means and containing draw plates or sizing collars according to the invention in two distinct sets alternating one after the other.
Figure 2:
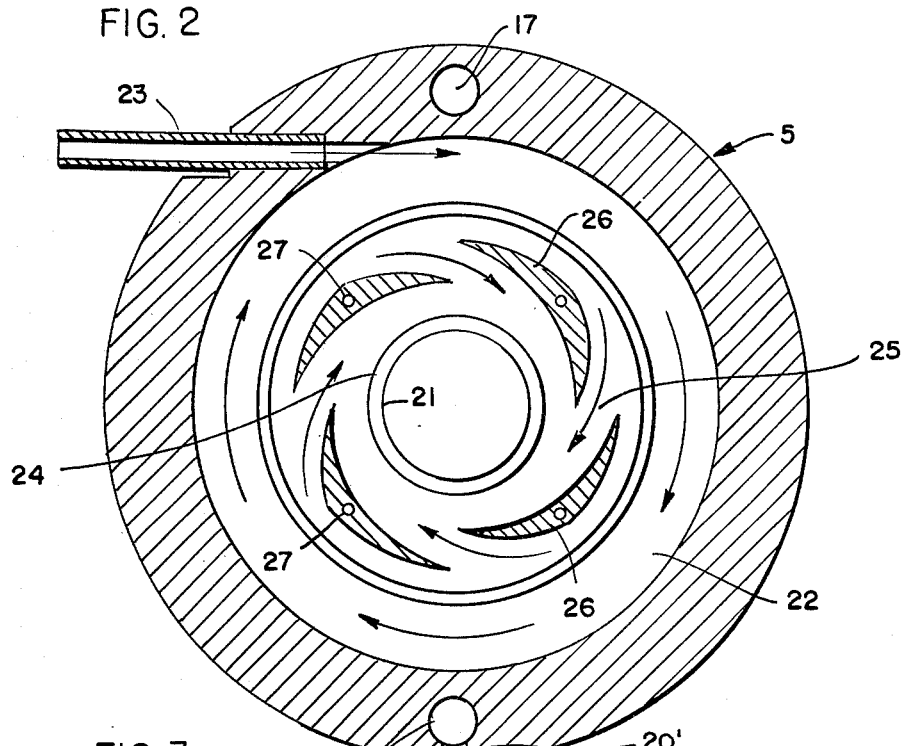
FIG. 2 is a cross-sectional view of one embodiment of a draw plate according to the invention as taken on line 2—2 of FIG. 3.
Figure 3:
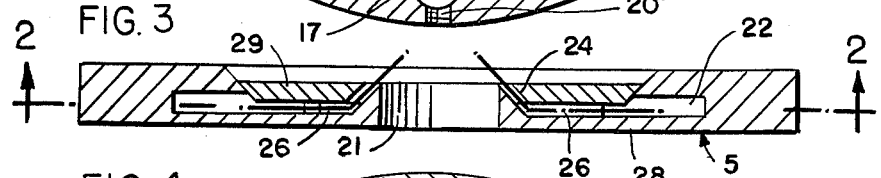
FIG. 3 is a longitudinal section of the draw plate shown in FIG. 2.
Figure 4:
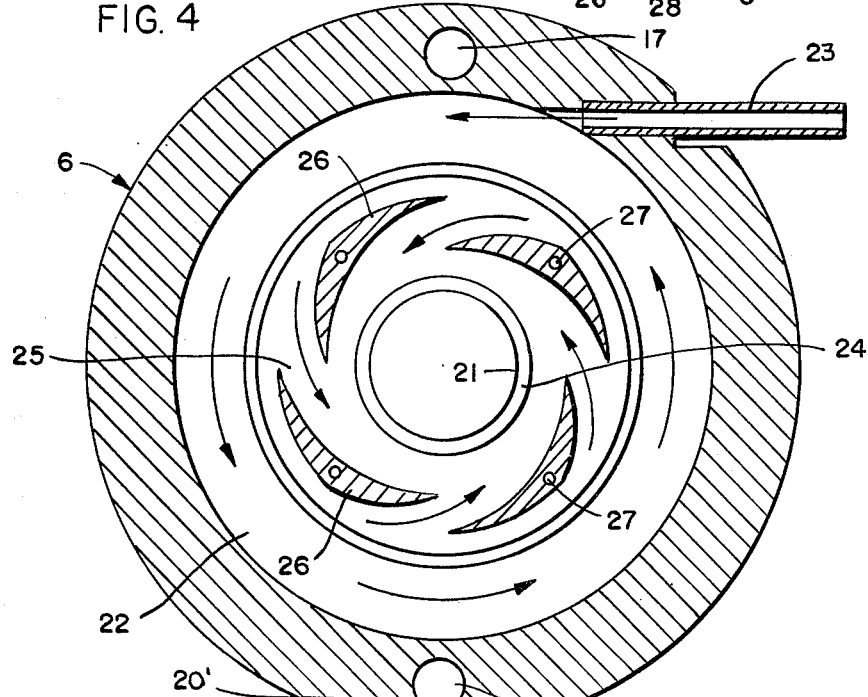
Figure 5:
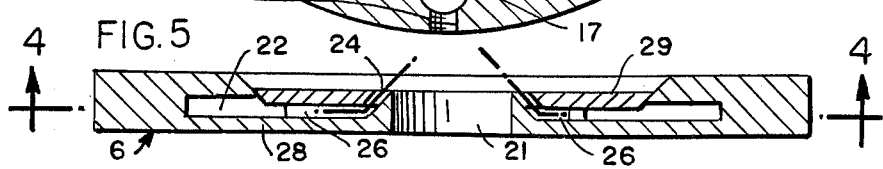
Figure 6:
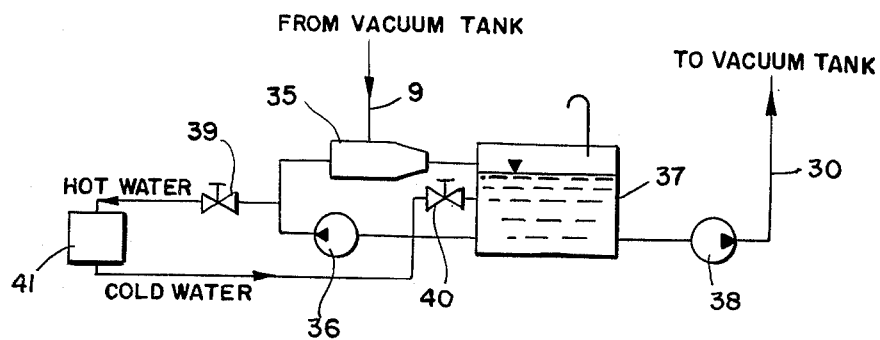
Figure 7:
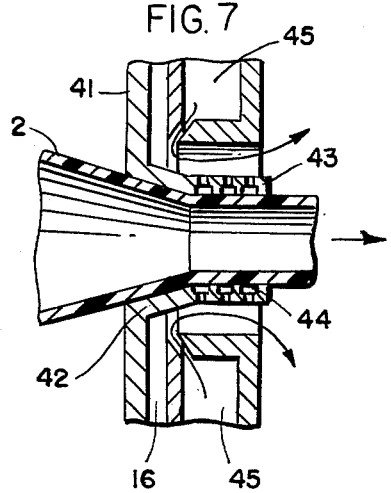
Figure 8:
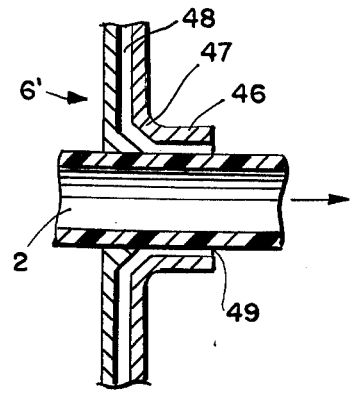
Figure 9A:
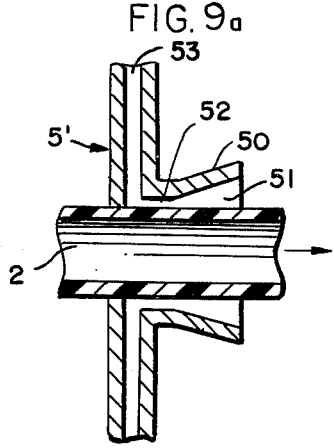
Figure 9B:
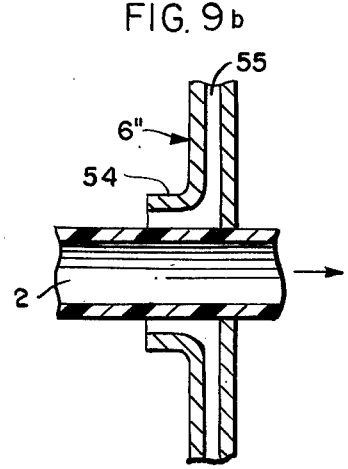

FIGS. 4 and 5 are views identical with FIGS. 2 and 3, respectively, except that the construction provides a mirror image as when FIGS. 2 and 4 are placed on either side of a mirror plane in which the feed arrows are aligned and pointing at each other;

FIG. 6 is a schematic illustration of a cooling and circulating system with vacuum means as used in conjunction with the vacuum tank of FIG. 1;

FIG. 7 is a longitudinal sectional view of a special calibrating entry sleeve placed at the front or receiving end of the vacuum tank;

FIG. 8 is a partial longitudinal sectional view of one particular variation in the draw plate according to the invention; and FIGS. 9a and 9b are similar longitudinal sectional views of two additional variations in draw plates useful for purposes of the invention.

The vacuum trough or tank 1 according to the invention is positioned to directly receive a freshly extruded hot thermoplastic tube 2 from a melt extruder 3 as shown in FIG. 1, the tube 2 entering the tank through a flanged sleeve 4 and then passing through a series of alternating draw plates 5 and 6 while being drawn off at the rear end of the tank by the puller 7. The finished tube 2' has been solidified and cooled while being sized in the tank 1 which contains cooling water 8 with a vacuum provided through the overflow downpipe 9. After this finished tube 2' is pulled off it can be cut to standard lengths by a conventional cross-cutting device (not shown) or, if sufficiently flexible, it may be wound into a coiled or spooled package.

The extruder 3, shown at its discharge end, has a suitable nozzle or die plate assembly 10 which is illustrated schematically and not in specific detail. An axial opening 11 extends backwardly through the central mandrel or plug 12 of the extruder and is open to the atmosphere or may also be placed under a positive pressure in a conventional manner. The thickness of the tube 2 being extruded can ordinarily be adjusted, for example by axial displacement of the plug 13 in relationship to the outer concentric segment 14 of the die assembly. If it is desired or necessary to provide a calibration or sizing of the inner diameter of the finished tube, this can also be readily accomplished by means of inner cooling and inner calibration as illustrated for example in the prior art by the German patents or published specifications: DT-AS No. 1,132,711; DT-PS No. 1,152,815; and DT-OS No. 1,704,972.

The initial sizing of the hot extruded tube is accomplished as the tube 2 is pulled and necked down from the extruder die assembly 10 so as to be given its shape and size by the calibrating entry sleeve 4 which has an inner diameter corresponding closely to the outer diameter of the finished tube. The remaining calibration or finish sizing is then accomplished in the tank 1 by the draw plates 5 and 6 which have a central circular opening bearing against the outer circumference of the tube 2 as it is cooled. Since there is a greater pressure internally of the tube in the vacuum tank, this still warm and deformable tube is calibrated or sized by the series of draw plates which remain in direct contact with the tube being drawn therethrough.

The vacuum tank 1 is rectangular in its construction and is partially filled with a liquid cooling medium 8, preferably water, while being suitably enclosed for operation under a vacuum or a pressure which is reduced below atmospheric pressure. The tank has a cover door or panel 15 which may be opened for the purpose of inspecting or servicing the interior, but this cover must be tightly closed and made impervious to the entry of air during operation of the apparatus. For solidifying the hot extruded tube 2 and to carry off its sensible heat, cooling water is continuously supplied through the draw plates 5 and 6 as well as the entry sleeve 4 into the tank and then withdrawn through the downpipe 9, which can have a telescopic construction so as to adjust the liquid level in the tank. The space above this liquid level in the tank is essential for maintaining a vacuum.

The flange of the entry sleeve calibrating device 4 covers the front opening 16 of the tank 1, and the flow off of the water as liquid cooling medium can be readily prevented in known manner by using suitable entry gaskets, vacuum means and/or especially a fluid sealing means using apertures in the sleeve. The entry sleeve 4 itself is described in greater detail hereinafter. A similar gasket or packed sealing means can also be used to seal the back opening of the tank where the finished tube 2' emerges.

The individual draw plates 5 and 6, respectively, as cooling and sizing means are arranged one after the other at predetermined spaced intervals along the tube in the tank 1 and are aligned with each other and with the entry sleeve 4 on the tube or calibrating axis. In order to mount these draw plates, they are provided with diametrically opposite bores 17 near their outer circumference and supported on rods 18 extending through these bores and fastened tightly by water-tight fittings 19 to the tank 1.

The mutual or cooperative axial spacing of the draw plates is generally dependent upon the calibrating conditions, especially the speed of extrusion and the gradual solidification of the hollow tubing under a given cooling rate. Such spacing is made adjustable by the variable positioning of the draw plates 5 and 6 along the oppositely disposed rods 18 with the plates being fixed in place by means of set screws 20 inserted into suitably threaded radial bores 20' (FIGS. 2 and 4). The rod 18 may also be threaded so that the individual draw plates can be adjusted between spacing nuts or preferably spacer sleeves which can be turned on the rod to position and tighten the plates axially of the tube axis in the tank. However, it is sufficient to slightly flatten the cross-section of the rod 18 at least along that side on which the clamping screws 20 are tightened.

The draw plates 5 and 6 are illustrated in detail in FIGS. 2, 3, 4 and 5 wherein each of the two mirror image plates are made up of essentially the same elements or parts and these are identified by the same reference numeral in each case. Each plate has a central circular calibration or sizing opening 21 which has the same diameter in each succeeding draw plate in the direction of travel of the tube, i.e. the so-called calibration direction or towards the rear end of the tank axially of the tube. These openings 21 are thus adapted to provide the final carefully defined outside diameter of the tube 2' within a relatively small tolerance. In order to provide a feed and circulation of water as the liquid cooling medium for solidifying the extruded tube, each draw plate is constructed in accordance with the invention to enclose a ring channel or chamber 22 through which the cooling water flows with an exit channel or opening into or around the calibration opening 21.

Such draw plates 5 and 6 in accordance with the invention are especially characterized by the provision of a feed conduit 23 which opens tangentially into the ring channel 22 positioned concentrically around the calibrating opening 21, the tangential feed location being adapted to establish a spiral flow of cooling water in the ring channel or chamber 22. A smaller annular slot or exit ring gap 24 is in fluid connection with the ring channel and opens directly behind and concentrically around the calibrating opening 21 so as to permit the cooling water to flow off in an axial direction over and around the periphery of the tube 2. The initial spiral flow pattern of the coolant established by the feed means 23 in ring channel 22 is continued in this outlet formed by the annular slot 24. By narrowing the cross-section of the flow conduit at this annular slot 24, the velocity of the cooling water is correspondingly increased, thereby providing a relatively turbulent and rapid spiral pattern of flow of the coolant axially along the tube being treated, i.e. as the tube emerges or protrudes from each draw plate.

In an especially preferred embodiment of the invention as illustrated by FIGS. 2 to 5, the relatively narrow inner annular slot 24 is connected with the larger outer ring channel or chamber 22 through at least one and preferably a number of intermediate spiral channels 25 which are limited or bounded laterally by profiled flow guide elements 26 or similar flow guide means inserted between the outer ring channel 22 and the inner annular slot 24 to create a more definite spiral path of flow of the cooling medium as initiated by the tangential feed means 23. The flow guide means 26 thus divide the ring channel 22 into four fluid streams 25 displaced in rotation around the entire circumference and spirally directed into the annular exit slot 24.

The guide elements 26 can also serve to begin the narrowing of the flow path so that the flow velocity is gradually increased over the entire length of each spiral flow path. The surface portions of the guide elements as seen in cross-section are preferably curved line segments of a circle.

By means of fastening pins, screws or bolts through the bores 27, the guide elements 26 can be firmly connected to both the face plate 28 and inset back plate 29 into which a nut or bolt head can be countersunk (not shown). The back plates with the guide elements are preferably easily removable so that one can provide various designs for the intermediate spiral flow paths including changes in cross-sectional dimensions. Other suitable constructions can also be readily adapted to provide draw plates having the essential tangential feed and spiral flow of cooling liquid as required by the present invention.

The tangential feed conduit 23 and the flow guide elements 26 are arranged in the draw plate 5 of FIGS. 2 and 3 in such a manner that the spiral flow of the cooling medium before its exit through the annular slot 24 into the vacuum tank is moved in a clockwise direction of rotation as indicated by the arrows. The opposite or counterclockwise rotation direction of spiral flow of the cooling medium is established in the draw plate of FIGS. 4 and 5 in an analogous manner due to the mirror image symmetry of the two different draw plates.

As seen in FIG. 1, the two sets of draw plates 5 and 6 alternate with each other so that the direction of spiral flow alternates first clockwise and then counterclockwise over the entire series of draw plates, not only within the channels of the draw plates but also where the cooling medium flows outwardly from the annular discharge slot 24 onto the tube periphery. This arrangement is desirable, especially at high flow velocities, to prevent the still plastic hollow tube from being twisted by spiral streams flowing in only one rotational direction to produce a single relatively large turning movement on the tube. With the direction of the spiral flow alternating back and forth, such twisting remains minimal and has no deforming effect. Moreover, this alternative of the direction of spiral flow has the advantage of further increasing the mixing and turbulency of the cooling liquid between the draw plates so that the temperature is more uniform over the cooling tank.

The annular discharge slots 24 of the draw plates 5 and 6, as illustrated in FIGS. 1 to 5, are inclined with respect to the calibration or tube axis by an angle of about 45°. In principle, this inclined angle can be varied from 0° to 90° but is advantageously selected as an angle of less than 45°, preferably less than 30° and usually more than 15°, for at least a first group of draw plates at the forward end of the vacuum tank while this angle can then be increased up to as high as 90° at the rear or tube outlet end of the vacuum tank.

Except in those instances where the spiral jet stream of liquid cooling medium has an exit angle of 0° at the discharge slot 24, there is a radial component of the stream velocity as well as an axial component. Even at an inclined angle of 90°, the relative movement of the tube and the axial escape of the liquid stream will tend to result in at least a small axial component. However, the radial component exerts a certain force on the tube being calibrated due to the impact pressure and congestion or damming of the flow stream at the tube wall, thereby improving the contact between the tube and the cooling medium. On the other hand, under those circumstances where the tube is still relatively hot and plastic, deformations of the tube surface can occur from the direct radial impingement of the cooling liquid. For this reason, the first group of draw plates are preferably constructed with the annular discharge slot at an angle of less than 45° or preferably less than 30° with reference to the tube axis, thereby avoiding damage to the surface of the freshly extruded and only partially cooled tube.

With progressive and more complete solidification of the extruded tube, a second group of draw plate such as those identified as 6' and 6'' in FIG. 1 can have an annular discharge slot which is arranged perpendicularly (90°) to the tube axis as a narrow continuation of the ring channel or intermediate spiral channels (see also FIGS. 9a and 9b). Once the tube wall has become highly solidified, particularly so as to be quite resistant to any deformation by the impact pressure of the cooling jet stream, this 90° angle of the spiral flow stream is especially useful to increase the rate of heat transfer, i.e. to increase the intensity of cooling. As the angle of impingement approaches higher values up to 90°, the spiral jet stream also tends to be released in the tank at a similar perpendicular angle directly away from the tube surface, thereby producing an excellent mixing of the coolant as well as rapidly leading heat away from the tube.

Thus, the spiral jet streams from each draw plate 5 and 6 produce an excellent mixing and heat dissipation effect between the draw plates as well as alternate positive (clockwise) and negative (counterclockwise) directions of spiral rotation acting directly on the tube passing through the plates and also applying freshly introduced cooling medium onto the tube surface. This symmetrical impingement pressure or force acting on the tube wall is thus accompanied by an increase turbulence of the cooling liquid in the vacuum tank 1.

As shown in FIG. 1, cooled and recirculated water is brought to the tank 1 by means of a central or main distributor pipe 30 from which two or even more feeder lines 31 and 32, parallel to the tube axis, can lead to the individual draw plates 5 and 6 as connected by the corresponding individual stub lines 33, each of which has its own adjustable valve V to regulate the flow of cooling liquid to the feed conduit 23 within the draw plate. If desired, the feeder lines 31 and 32 can be connected to the feed conduits 23 by means of flexible hoses to permit at least some axial adjustment of the draw plates without requiring a disconnection of the lines delivering the cooling medium.

The recirculation of the cooling medium together with a simultaneous production of a vacuum in the tank 1 is shown only partly by FIG. 1 while being completed in greater detail in schematic form by FIG. 6.

The level of water or other cooling medium 8 in the tank 1 is maintained by the intake position 34 of the downpipe 9 as fresh cooling liquid is delivered through the draw plates 5 and 6 for turbulent spiral mixing in the tank. This downpipe 9 leads the overflow water to the suction device 35 which also simultaneously withdraws air above the water level in tank 1 to create at least a partial vacuum in the tank. This suction device 35 can be a jet nozzle or injector which is supplied with water as the jet fluid from a first circulating pump 36 drawing water from the cooling water reservoir 37. The cooling water from this retention vessel or reservoir 37 is also recycled by means of the second pump 38 back to the vacuum tank sizing apparatus through the main distributor line 30. When the cooling water in the reservoir 37 reaches too high a temperature through the return of heated water by the suction device 35, then the valves 39 and 40 can be automatically opened to withdraw hot water with pump 36 through valve 39 and supply fresh cold water through valve 40. This recooling of the water in the reservoir 37 can be carried out intermittently or continuously by means of a conventional heat exchanger 41. Where there is an ample supply of cooling water, the effluent hot water from valve 39 can simply be discharged or used elsewhere while directly supply fresh cold water through valve 40.

FIG. 7 illustrates in longitudinal section an entry sleeve 41 similar to the flanged sleeve 4 of FIG. 1 but with minor preferred variations. In addition to a flanged extension for fastening the sleeve to the front face of the vacuum tank, the sleeve itself is formed by a first frusto-conical segment 42 tapered radially inwardly in the direction of tube travel and preferably being integral with a second cylindrical segment 43. The conically inwardly tapered segment 42 at the feed or receiving end of the sleeve acts to narrow the outer diameter of the freshly extruded but thermoplastic tube 2 as it is introduced into the tank 1, thereby providing the initial sizing or calibration of the hot tube within relatively broad limits. In the cylindrical segment 43, a plurality of radial bores 44 are provided with openings distributed over the inner circumference of this segment with means to place these bores under a vacuum. The liquid cooling medium is supplied from the chamber 45 around sleeve 44 in the direction of the arrow at a relatively high velocity sufficient to create a suction effect in passing over the outer ends of the bores 44 which have a smaller diameter over one portion extending from the outer circumference of sleeve 43 while exhibiting a larger diameter over that portion extending from the inner circumference. In addition to this suction effect, the sleeve 43 is open to the interior of tank 1 so that the reduced pressure of the tank also permits an expansion of the tube 2 in the sleeve 43 in the same manner as in the following draw plates. The space 16 can be filled with a gasket or suitable packing material to help seal the front end of the vacuum tank.

According to the invention, it has been found to be most useful to provide an entry sleeve in which the first frusto-conical segment 42 is tapered in the direction of tube travel over a length of 0.2D to 1D where D represents the outer diameter of the tube being introduced into the tank. At the same time, this length of the tapered sleeve segment is preferably at least about 10 mm. under most circumstances. In general, this tapered segment should be kept as short as possible to avoid undesirable frictional forces on the tube periphery. Such friction can also be substantially reduced by providing the inner surface of the entry sleeve 42,43 with a roughness size of more than 0.1 mm. and a bearing surface in direct running contact with the tube which is proportionately less than 30% of the total surface opposing the introduced tube. This proportion of the bearing surface to the total inner circumferential area of the entry sleeve is most preferably about 10 to 29%. Friction on the still hot and deformable tube is thus reduced as far as possible.

This special form of the entry sleeve also has the advantage of achieving the smaller diameter of the finished tube 2' within a shorter cooling bath length and/or with fewer draw plates in the bath. At the same time, the front end of the bath is effectively sealed off from the outside.

One preferred variation of a draw plate 6' is illustrated in FIG. 8 and is especially useful toward the rear end of the vacuum tank where the distance between draw plates ordinarily will increase so that there is a somewhat larger span of the more solidified tube with a correspondingly larger volume of the cooling bath at this point. The essential feature of this draw plate 6' is the provision of a lip 46 projecting rearwardly of the draw plate and concentrically to the tube axis as a cylindrical extension of the concentric nozzle ring defining the annular discharge slot 47 fed by the ring channel 48. Thus, this annular slot 47 is arranged to open as a concentric nozzle ring directly adjacent the point 49 at which the tube emerges or projects from the central sizing opening, e.g. preferably at the back side of the draw plate.

FIGS. 9a and 9b show similar variations of the draw plate to provide lip extensions for the concentric nozzle ring as guide means for the exit or outward flow of cooling liquid from the annular discharge slot. In the draw plate 5' of FIG. 9a, this lip 50 extends conically to diverge radially outwardly from the annular slot 52 to provide a larger annular discharge opening 51 towards the rear of the tank. In the draw plate 6" of FIG. 9b, the cylindrical lip 54 extends toward the front of the tank as a preferred measure for the last sizing plate located adjacent the back end of the tank 1 as indicated in FIG. 1. In both of the last two draw plates 5' and 6'', the ring channels or intermediate spiral guide channels 53 and 55 are directed radially inwardly to provide an annular discharge slot having an angle of inclination of practically 90° to the tube axis so that cooling liquid has a strong radial component impinging directly on the tube surface. Since the tube is almost completely solidified in these last two stages of the vacuum sizing tank, this pressure exected by such direct impingement of the cooling liquid has no damaging effect on the tube or its outer surface.

The use of a lip extension on the annular slot or concentric discharge nozzle ring is especially advantageous in guiding the spiral flow of the cooling medium in a more or less close spiral or helical path around and along the tube projecting from the draw plate while preventing an immediate radial flow away from the tube. The cooling medium is thus maintained and concentrated along the tube surface for a slightly greater distance which is especially helpful in the final cooling stages. Also, the cooling liquid then begins to mix and flow radially away from the tube at a point which is more centrally located between the last pairs of draw plates. Where the direction of spiral flow is reversed at the last draw plate 6'', a better mixing effect is achieved with an improved recirculation of the cooling liquid back toward the downpipe 9 as seen in FIG. 1. The amount of cooling medium delivered to the tube in these latter draw plates such as 6', 5' and 6'' can also be increased to ensure complete cooling of the tube and to maintain a lower average temperature in the cooling bath of the vacuum tank 1.

The design of the draw plates as both cooling and sizing means with a definite spiral flow pattern being imparted to the cooling liquid has a number of important advantages, especially when used in the preferred vacuum tank type of sizing apparatus.

In comparison to known draw plates commonly used in this art, the present invention offers a means of establishing a torque or rotational movement of the liquid cooling medium around the calibration or tube axis as the cooling medium is ejected and preferably rapidly directed in axial direction from an annular discharge slot or annular nozzle ring around the tube. The flow stream thus essentially follows a helical path on the peripheral surface of the tube with a more or less tight spiral depending upon the angle of inclination of the stream directed onto the tube by the draw plate. It should be noted that with otherwise identical structural features and operating conditions, especially with the same width of the annular discharge gap or slot and an equal throughput of cooling medium, the flow speed of the radially outwardly streaming component of the liquid stream is much higher due to the strong rotational movement imparted by the draw plate. Also, the absolute velocity of the spiral jet stream is much higher because it has a tangential component which follows the outer periphery of the tube and does not enter into the calculation of throughout based on the axial flow through the annular discharge slot or concentric nozzle opening. Higher speeds of essentially turbulent liquid flow are thus achieved at an otherwise equal rate of throughout so that the Reynold's number and the corresponding heat transfer coefficient is also substantially increased. For example, in cooling a polyester (polyethylene terephthalate) tube, it has been found that the heat transfer coefficient is increased about eight times if the flow velocity is increased to 1.5 meters/second compared to a flow velocity in a stagnant or static bath where there is no flow or only a very minimal laminar flow of the bath along the tube. In general, it is desirable to achieve flow velocities of at least 1.0 meters per second and preferably about 1.5 meters per second or more.

Between the metallic calibrating dies or sizing means of the draw plates in which the thermoplastic tube is gradually calibrated to its final size, the apparatus of the present invention provides a circulation of liquid in the cooling tank around the extruded tube with a stream direction which is nearly perpendicular to the tube axis, depending upon the size of the tangential component of the spiral stream velocity emerging from the the draw plates. This perpendicular or transverse bath flow, as influenced by the tangential component of the jet cooling stream, also contributes to the improvement of heat transfer from the tube to the cooling bath. The present invention thus provides an excellent cooling effect in terms of rapid, turbulent liquid flow along the tube periphery accompanied by a very strong tangential removal of heat and its dissipation in the cooling bath between each sizing die or calibrating means represented by the individual draw plates.

When all factors are considered, the improvement in heat transfer and cooling of the extruded tube is so great when using the draw plates and sizing means of the invention that one can substantially increase the speed of calibration in a cooling bath of given size or else the bath length can be substantially reduced at a given draw-off speed of the extruded tube. As a result, the mechanical requirements placed on the still plastic tube wall, such as the pulling tension or surface forces applied, are also substantially reduced so that less force is needed to pull the tube through the sizing apparatus and to overcome the friction between the tube and the sizing means and the drag resistance of the cooling bath itself. The entry sleeve tends to cause the greatest tension and frictional resistance on the tube walls in the apparatus of the invention so that specific improvements in this element are of special value when carried out in accordance with the present invention.

With higher extruding and draw-off sizing speeds possible with the improved sizing and cooling techniques of the present invention, the large scale production of thermoplastic tubing becomes more economical but still yields a product of high uniformity and high quality. At the same time, the apparatus and the methods used are very adaptable to different thermoplastic materials as well as different sizes of the tubing. Moreover, the individual sizing elements can be constructed in accordance with the invention but widely used in all types of sizing apparatus even though the vacuum tank sizing apparatus is especially preferred. In this sense, the invention constitutes an improvement in the individual sizing means and procedure as well as an improvement in a vacuum tank sizing or calibrating apparatus.

The invention is hereby claimed as follows:

1. In an apparatus for the manufacture of an extruded thermoplastic tube including a vacuum tank partially filled with a liquid cooling medium to receive and cool the hot extruded tube and a plurality of draw plates with central openings as calibrating means aligned at spaced intervals within said tank along the axis of the extruded tube, the improvement which comprises:

a feed conduit for said liquid cooling medium opening tangentially into a ring channel contained within each draw plate around the central opening thereof; and an annular liquid discharge slot extending inwardly from said ring channel toward the periphery of the tube.

2. Apparatus as claimed in claim 1 wherein said annular liquid discharge slot is in fluid connection with said ring channel over at least one intermediate spiral channel.

3. Apparatus as claimed in claim 2 wherein a plurality of intermediate spiral channels are formed between flow guide elements limiting the ring channel laterally.

4. Apparatus as claimed in claim 1 wherein said annular discharge slot opens toward the tube periphery at an inclined angle of between 15° and 90° with reference to the tube axis.

5. Apparatus as claimed in claim 4 wherein the annular discharge slot in a first group of draw plates arranged in said vacuum tank is inclined at an angle of less than 45° with reference to the tube axis.

6. Apparatus as claimed in claim 4 wherein the annular discharge slot in a first group of draw plates arranged in said vacuum tank is inclined at an angle of less than 30° with reference to the tube axis.

7. Apparatus as claimed in claim 5 wherein the annular discharge slot in a second group of draw plates, which are arranged after said first group of draw plates in the direction of tube travel, is inclined at an angle of 90° to the tube axis.

8. Apparatus as claimed in claim 1 wherein said annular discharge slot opens in a concentric nozzle ring directly adjacent the point at which the tube emerges from said central opening on the back side of said draw plate.

9. Apparatus as claimed in claim 8 wherein said concentric nozzle ring has a cylindrically or conically shaped lip projecting rearwardly of the draw plate and concentrically to the tube axis.

10. Apparatus as claimed in claim 1 wherein two sets of draw plates are arranged in the vacuum tank alternately one behind the other with flow directing means including said feed conduits to direct the liquid cooling medium in a spiral flow path through said ring channel and outwardly through said annular discharge slot onto the tube periphery, the direction of spiral flow being clockwise in one set of draw plates and counterclockwise in the other set of draw plates.

11. Apparatus as claimed in claim 10 wherein said flow directing means include flow guide elements inserted in each ring channel.

12. Apparatus as claimed in claim 1 wherein said feed conduits are connected through axial feeder lines to a common supply distributor for the liquid cooling medium.

13. Apparatus as claimed in claim 12 with individual valve means connecting each feed conduit to its feeder line for controlling the supply of liquid cooling medium to each draw plate.

14. Apparatus as claimed in claim 1 including a sleeve entry means at the front end of the vacuum tank for the feed insertion of the hot extruded tube, said sleeve being conically tapered to narrow the outer diameter of the tube as it is introduced into the tank.

15. Apparatus as claimed in claim 14 wherein said sleeve is tapered in the direction of tube travel over a length of 0.2 to 1 times the outer diameter of the tube being introduced.

16. Apparatus as claimed in claim 14 wherein said sleeve has a first conical segment followed by a cylindrical segment with a plurality of radial bores in said cylindrical segment to provide openings distributed over the inner circumference of said cylindrical segment, through which openings the hot extruded tube is placed under vacuum.

17. Apparatus as claimed in claim 14 wherein said sleeve has an inner circumference with a roughness of more than 0.1 mm. and a bearing surface proportion of less than 30% with reference to the total surface opposing the introduced tube.

* * * * *